L. BREYER.
COFFEE ROASTER.
APPLICATION FILED APR. 28, 1909.
934,137.
Patented Sept. 14, 1909.
2 SHEETS—SHEET 1.
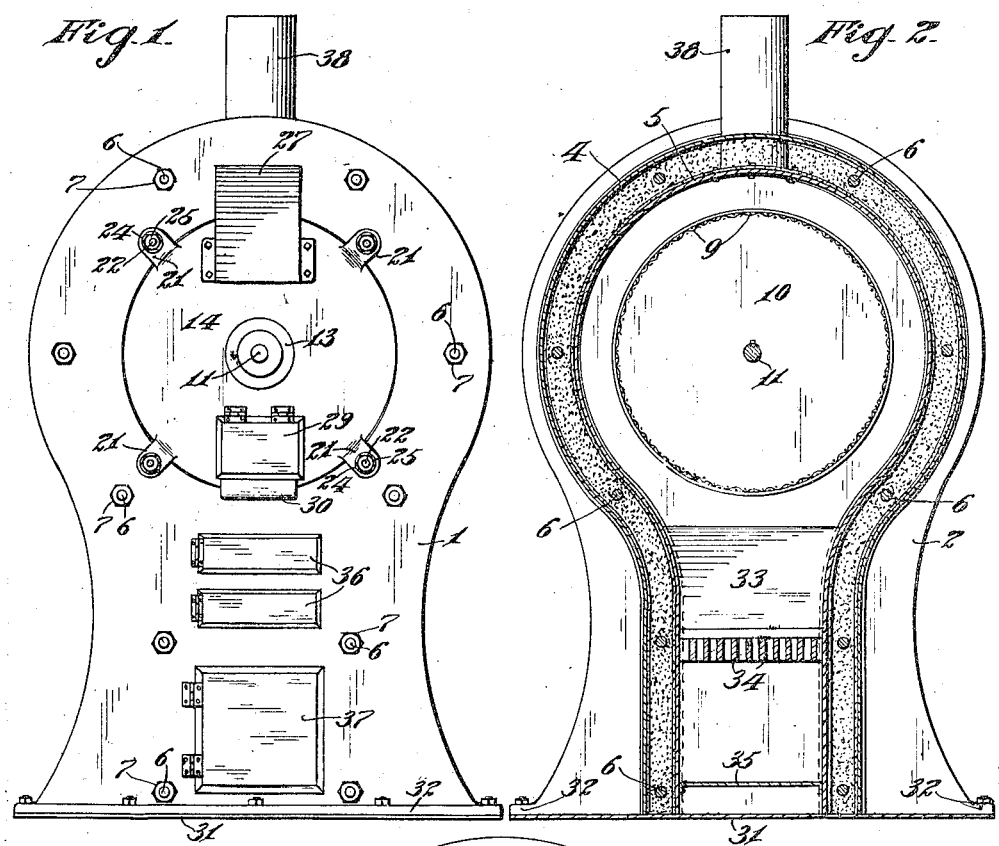
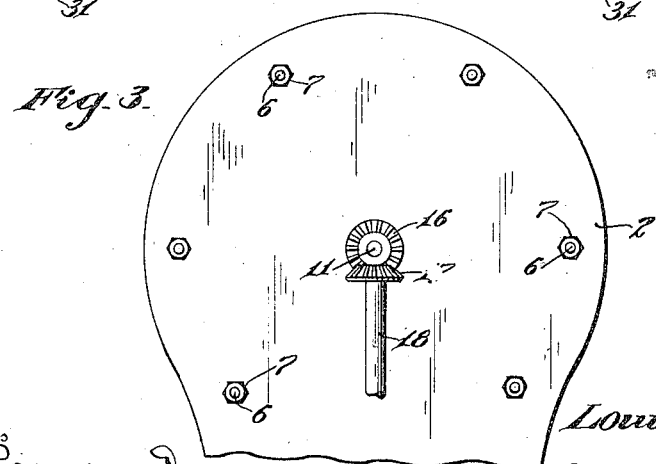
Witnesses
Theo. Risemann.
J. A. L. Mulhall.
Inventor
Louis Breyer,
By Joshua R. H. Potts
Attorney

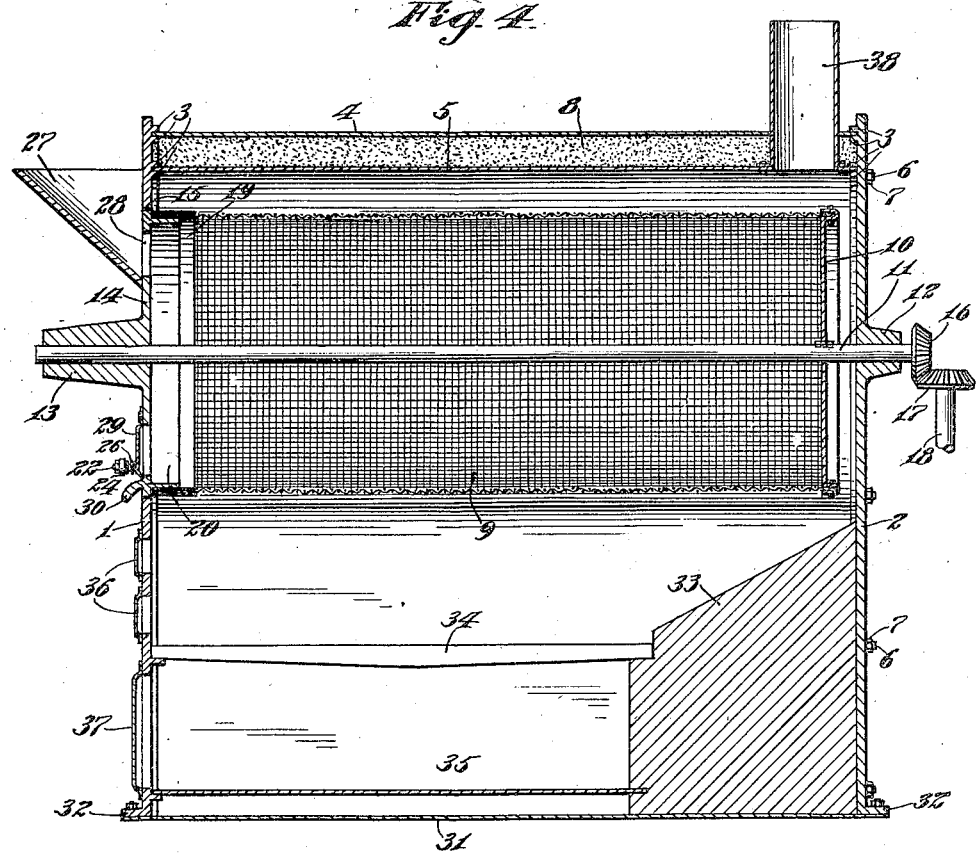

UNITED STATES PATENT OFFICE.

LOUIS BREYER, OF PHILADELPHIA, PENNSYLVANIA.

COFFEE-ROASTER.

934,137.   Specification of Letters Patent.   Patented Sept. 14, 1909.

Application filed April 28, 1909.   Serial No. 492,739.

*To all whom it may concern:*

Be it known that I, LOUIS BREYER, a citizen of the United States, residing at Philadelphia, in the county of Philadelphia, and State of Pennsylvania, have invented certain new and useful Improvements in Coffee-Roasters, of which the following is a specification.

My invention relates to an improved coffee roaster, an object of the invention being to provide an improved coffee roasting cylinder, which will allow for expansion and contraction of the coffee during the roasting operation, and which will automatically adjust itself to suit conditions.

A further object is to provide an improved coffee roaster, which can be knocked down and readily transported from place to place, which will not require skilled labor to assemble, and which will be to a certain extent portable.

With these and other objects in view, the invention consists in certain novel features of construction, and combinations, and arrangements of parts as will be more fully hereinafter described and pointed out in the claims.

In the accompanying drawings, Figure 1, is a view in elevation of one end of the coffee roaster. Fig. 2, is a view in cross section. Fig. 3, is a fragmentary view of the opposite end of the roaster. Fig. 4, is a view in longitudinal section. Fig. 5, is a fragmentary detail view in section through the head, and Fig. 6, is an enlarged fragmentary view in longitudinal section.

1 and 2 represent the ends of the roaster, and comprise metal plates or castings, provided at their opposed faces with parallel ribs 3, between which parallel metal plates 4 and 5 are positioned as clearly shown in Fig. 6, and rods 6 are passed through alined openings in the plates 1 and 2, and extend throughout the roaster between the plates 4 and 5, and are securely clamped by means of nuts 7 screwed onto the ends of the rods and against the plates 1 and 2. the roaster casing being effectually clamped together. These plates 4 and 5 are of the general shape shown in Fig. 2, and provide a space or hollow wall to be filled with sand 8 or other suitable material, to retain the greatest possible heat within the casing.

9 represents a coffee roasting cylinder, which is preferably of wire netting, and secured at one end is a head 10, the latter keyed upon a shaft 11. This shaft 11 is mounted in a bearing 12 in the back plate 2, and in a bearing 13 in the cylinder head 14, which latter is located in an opening 15 in front plate 1.

A beveled pinion 16 is secured on shaft 11, and is driven by a pinion 17 on the shaft 18, which latter receives its power from any suitable source.

The forward end of cylinder 9 is provided with a ring 19, and an inwardly projecting flange 20 on head 14, projects into this ring, so as to close the end of the cylinder, and allow the head 14 considerable movement on the shaft 11 without allowing any of the coffee to escape from the cylinder. This head 14 is provided with perforated tongues 21 projecting over the plate 1, and bolts 22 are screwed into plate 1, and secured by nuts 23. These bolts 22 project through the perforated tongues 21, and are provided with cap washers 24 and nuts 25 at their outer ends, and coiled springs 26 surround the bolts 22 and are disposed between the tongues 21 and washers 24 to exert pressure on the head 14, and normally hold the tongues 21 against the plate 1. The head 14 is provided with a feed hopper 27, communicating with an opening 28 in the head, to permit the coffee to be supplied to the cylinder, and an outlet door 29 is provided above the spout 30, so as to direct the discharge of coffee from the cylinder.

31 represents a bottom plate, which is securely bolted to the lower flanged ends 32 of plates 1 and 2, and a fire brick back wall 33 is located upon the bottom plate 31, and against the back plate 2, and supports grate bars 34 and a partition 35, the latter serving as a bottom for the ashpit, and providing an air space between the bottom of the ashpit and the bottom plate 31, to prevent the transmission of heat to the floor.

The doors 36 provide access to the fire box, and an ashpit door 37 is provided as shown, to enable the ashes to be readily removed from the ashpit, and 38 represents a stack which projects through an opening in outer plate 4, and is secured to the inner plate 5 in register with an opening in the latter, so as to permit the escape of smoke and gases from the roaster.

The operation is as follows: Coal or other suitable fuel burning upon the grate bars 34, will thoroughly roast the coffee in the cylinder, and escape through the stack 38.

As is well known in roasting coffee, the coffee will expand, and some provision must be provided to prevent damaging the cylinder. It will thus be observed that I have provided a structure, which will enable considerable movement of the parts, and prevent damage, due to said expansion and contraction.

The head 10 is keyed on shaft 11, and can move on the shaft, the wire netting of which the cylinder is formed will permit a wide range of contraction and expansion without damage, and the head 14 which is elastically held against plate 1 by means of the springs 26, can move outwardly and inwardly a considerable distance, sufficient to compensate for any expansion and contraction which might occur.

It will thus be observed that I have provided a coffee roaster, which will absolutely prevent injury, due to the expansion and contraction, and I have also provided a coffee roaster which can be readily taken apart and assembled by any one of average intelligence, and does not require skilled labor of any kind. The roaster can be made of various sizes, and can be supplied to the trade at a minimum of cost, and will most effectually perform its function as a coffee roaster.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In a coffee roaster, the combination with a cylinder, a fixed plate having an opening therein, a head loose in the cylinder and located in the opening in the fixed plate, and elastic means at the edges only of said head exerting pressure on the head to elastically press the same toward the cylinder.

2. In a coffee roaster, the combination with a cylinder, of a fixed plate having an opening therein, of a cylinder head located in said opening, a flange on said cylinder head projecting into the cylinder, tongues on said head overlapping the plate, and springs pressing said tongues toward the plate.

3. In a coffee roaster, the combination with a cylinder, of a fixed plate having an opening therein, a cylinder head located in said opening in the plate, a flange on said head projecting into the cylinder, perforated tongues on said head overlapping the plate, bolts secured in said plate and projecting through the perforations in said tongues, nuts on said bolts, and coiled springs around said bolts between said nuts and the tongues.

4. In a coffee roaster, the combination with a wire screen cylinder, a head secured to said screen, a movable head at the other end of the cylinder, elastic means at the edges only of said movable head pressing the same toward the cylinder a shaft for turning said cylinder and projecting through said heads, and said first mentioned head keyed to said shaft.

In testimony whereof I have signed my name to this specification in the presence of two subscribing witnesses.

LOUIS BREYER.

Witnesses:
    J. A. L. MULHALL,
    R. H. KRENKEL.